Figure 1:
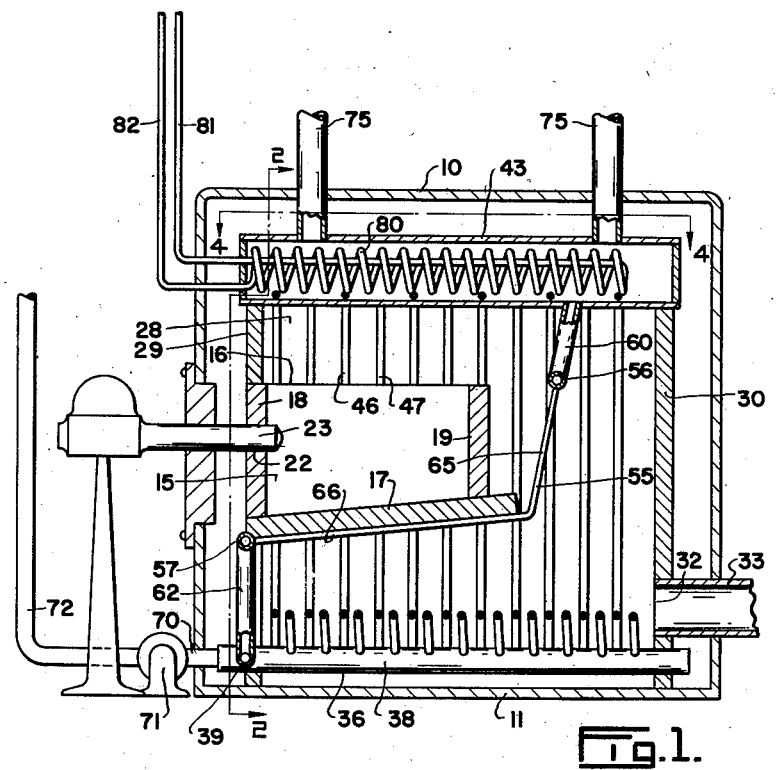

Nov. 26, 1957    G. REMPEL    2,814,280
WATER TUBE HEATING PLANT

Filed April 19, 1954    2 Sheets-Sheet 1

INVENTOR
GEORGE REMPEL
BY
Fetherstonhaugh & Co.
ATTORNEYS

Nov. 26, 1957 — G. REMPEL — 2,814,280
WATER TUBE HEATING PLANT
Filed April 19, 1954 — 2 Sheets-Sheet 2

INVENTOR
GEORGE REMPEL
BY
Featherstonhaugh & Co.
ATTORNEYS

United States Patent Office 2,814,280
Patented Nov. 26, 1957

2,814,280

WATER TUBE HEATING PLANT

George Rempel, Vancouver, British Columbia, Canada

Application April 19, 1954, Serial No. 424,138

9 Claims. (Cl. 122—328)

This invention relates to improvements in water tube heating plants.

An object of the present invention is the provision of a heating plant with a water tube construction and a flow of hot gases counter to the water flow which enables more heat to be extracted from the fuel than has heretofore been possible.

A further object is the provision of a tube construction in a heating plant that provides a maximum transfer of heat from the burning fuel in a limited space.

A further object is the provision of a heating plant with the water tubes arranged so that the water is preheated before it reaches the point where the flames first come into contact with the tube system, thus preventing the formation of carbon on the tubing.

It is well-known that in a large percentage of the heating plants in existence, the hot gases move out through the smoke pipe before they have had a chance to transfer very much of their heat to the water in the tubing. If space is unlimited, the hot gases can be kept in contact with the tubing for a comparatively long time, but in small compact units, this is difficult. The heating plant according to this invention is quite small and compact, and yet a large percentage of the heat is transferred from the combustion gases to the water before said gases pass out through the smoke pipe.

This heating plant includes an open-topped primary combustion chamber, and a distributor below and spaced from said chamber. A large header is provided above the top of the chamber, and a plurality of spaced water tubes extend upwardly from the distributor past the combustion chamber to the header. It is preferable to provide a secondary combustion chamber which includes the primary combustion chamber and the tubing. Suitable means are provided for directing water to the distributor, and for conducting hot water from the upper header. It is preferable to provide the secondary chamber with a smoke outlet which is near the bottom thereof. In the preferred form of the invention, the distributor has two arms extending beneath opposite sides of the primary combustion chamber, and the tubes from each distributor arm extend beneath the combustion chamber to the side thereof opposite said arm. The distributor also has a connector extending between adjacent ends of the arms, and tubes extending from this connector beneath the combustion chamber to the opposite end thereof and then up to the header.

Any type of fuel may be burned in the primary chamber. It is, however, preferred to burn gas or oil therein.

Figure 2:
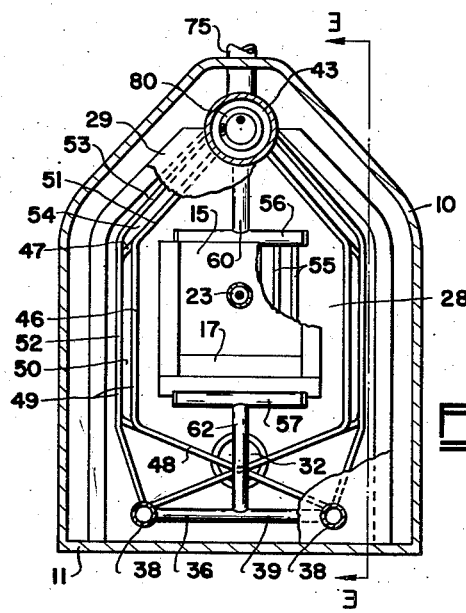
Figure 3:
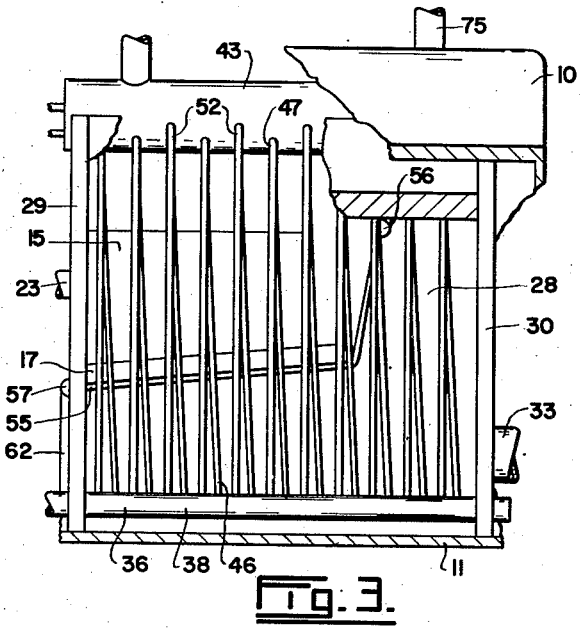
Figure 4:
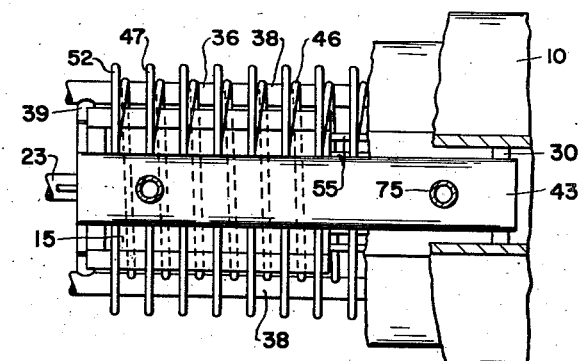

An example of this invention is illustrated in the accompanying drawings, in which, Figure 1 is a longitudinal section through a heating plant substantially midway between the sides thereof, Figure 2 is a cross section taken on the line 2—2 of Figure 1, Figure 3 is a longitudinal section taken on the line 3—3 of Figure 2, and Figure 4 is a horizontal section taken on the line 4—4 of Figure 1.

Referring to the drawings, the heating plant includes a casing 10 of any desired shape mounted on a suitable base 11. A primary combustion chamber 15 is mounted in the casing and spaced from the walls and bottom thereof. This chamber is open at the top, as indicated at 16 and has a bottom 17 sloping upwardly from its front end 18 to its back end 19. An opening 22 is formed in the front wall of the chamber for receiving the end of a gas or oil burner 23.

A secondary combustion chamber 28 is formed within the casing 10 around the primary chamber 15. If desired, the front end of the secondary chamber may be defined by a wall 29, and the back end thereof by a wall 30 which extend upwardly from the base 11. A smoke outlet 32 is provided in the wall 30 near the bottom thereof, and a sleeve 33 extends from this outlet through the casing 10, said sleeve being connected to a smoke pipe leading to a chimney when the device is in operation.

A distributor 36 is located beneath and spaced from the combustion chamber 15. This distributor is preferably, although not absolutely necessarily, in the form of a U having two parallel side arms 38, one substantially beneath each side of the primary chamber. A connector 39 extends between adjacent ends of these arms beneath the front wall 18 of the primary chamber.

A large header or tank 43 is mounted above and extends longitudinally of the primary and secondary combustion chambers substantially midway between the sides thereof. In the preferred form of the invention, this header is cylindrical in shape, as shown. A plurality of spaced water tubes extend upwardly from the distributor past the combustion chamber to the header. A plurality of inner and outer side tubes 46 and 47 extend from each distributor arm 38 across the bottom of the primary chamber, up the side thereof opposite from said arm, and back to the header 43. The lower portions 48 of these tubes lie in a common inclined plane, see Figure 2, while the vertical portions 49 have a space 50 therebetween. The upper portions 51 of these tubes are in a common inclined plane. If desired, a plurality of substantially vertical spaced side tubes 52 may be included. Each of these tubes extends upwardly from an arm of the distributor in line with and spaced from an inner tube 46 to the header 43. The upper portions 53 of the vertical side tubes extend in an inclined plane with a space 54 between it and the plane of the upper portions 51 of the other side tubes. A plurality of spaced back tubes 55 extend from an upper header 56 to a lower header 57. The upper header is located above the level of the top of the primary chamber 15 at the back thereof, while the lower header is positioned immediately below the bottom of said chamber at its front end. The upper header is connected by a central pipe 60 to the bottom of the larger header 43, and the lower header is connected by a central pipe 62 to the connector 39 of the distributor 36. The back tubes 55 are formed with substantially vertical portions 65 extending upwardly at the back of the primary chamber, and inclined portions 66 extending from said vertical portions along the bottom of the chamber. If desired, these back tubes 55 may actually extend directly from the connector 39 to the large header.

Suitable means is provided for directing water to either or both of the arms 38 of the distributor. In this example, a pipe 70 extends from the pressure side of a circulating pump 71, while a return pipe 72 is connected to the inlet of the pump. This pipe extends from the head radiators of the system, not shown. One or more pipes 75 extend upwardly from the large header 43 to the heating radiators.

The plant described so far is used only for heating. If it is desired to provide hot water for domestic or other uses, a coil 80 may be provided within the header 43, this coil having inlet and outlet pipes 81 and 82 extending therefrom.

In operation, air and fuel are directed by the unit 23 into the primary combustion chamber 15. The resulting flame rises upwardly through the open top 16 of this chamber where it comes into contact with the header 43. The flame is drawn over both sides and the back end of this chamber downwardly through the secondary chamber 28 to and through the outlet 32. As the flame moves downwardly, it comes into contact with the side tubes 46 and 47 and the back tubes 55. The substantially vertical side tubes 52 are also in the flames and hot gases, and these tubes increase the volume of water subjected to the heat without the necessity of increasing the size of the device. As the hot gases move towards the smoke outlet, they come into contact with the inclined lower portions 48 of the side tubes and pass over the top of the distributor 36. As the water rises in the side and back tubes, it is preheated so that it is quite hot by the time it reaches the upper portions of the side tubes and the header 43. As this header is immediately above the primary combustion chamber, it is located in the hottest point of the flame, but the flame is not unduly cooled by this contact because of the preheating of the water. This prevents the formation of carbon on the outer surface of the large header and upon the upper portions of the side tubes. As the upper header 56 is positioned above the level of the top of the primary chamber, the comparatively large volume of water therein is subjected to the heat of the flame when the latter is at its hottest point.

With the particular tube arrangement of this invenion, a large volume of water is always positioned immediately above the open-topped primary combustion chamber, and yet a large quantity of water comes into contact with the flames and the hot combustion gases as they pass downwardly to the sides and end of said chamber and move through the secondary combustion chamber to the smoke outlet. The flow of hot gases is mainly counter to that of the water in the tubes.

While a circulating pump 71 has been shown, it is obvious that said pump may be omitted, in which case the water will naturally flow upwardly in the system.

What I claim as my invention is:

1. A heating plant comprising a casing, a secondary combustion chamber in the casing, an open-topped primary combustion chamber having a solid bottom and a defining wall projecting upwardly therefrom, said primary chamber being spaced from the top, bottom, sides and an end of the secondary chamber and adjacent the front end thereof, a smoke outlet from the secondary chamber near the bottom thereof and at the back end of the casing, a distributor below and spaced from the primary chamber, said distributor having two arms extending beneath and in the same direction as opposite sides of the primary chamber and a connector extending between ends of said arms beneath the forward end of said primary chamber, a large common header extending immediately above the open top of the primary chamber centrally thereof and substantially parallel with the distributor arms, means for conducting water away from the header to a heating system, a plurality of spaced water tubes extending upwardly from the distributor past the primary chamber to the common header, some of said water tubes extending upwardly past the sides of the primary chamber and inwardly over the open top of the latter and opening directly into the common header and other of said water tubes extending from the distributor connector beneath the bottom of the primary chamber to the end thereof opposite the end under which said connector is located and then up to the header discharging thereinto, and means for conducting water from said heating system to the distributor.

2. A heating plant as claimed in claim 1 in which the tubes of each distributor arm extend beneath the primary chamber to the side thereof opposite said arm and then up and over said chamber to the header.

3. A heating plant as claimed in claim 1 including a back header positioned above the level of the top of the back end of the primary chamber, said back header being connected to discharge into the large common header by at least one pipe, and in which the tubes from the distributor connector extending beneath the primary chamber open into the back header.

4. A heating plant as claimed in claim 1 in which some of the tubes of each distributor arm extend beneath the primary chamber to the side thereof opposite said arm and then up to the header, and the remainder of the tubes of said arm extend directly up to the header along the side of said primary chamber above the arm.

5. A heating plant as claimed in claim 1 in which the tubes of each distributor arm are inner and outer tubes extending beneath the primary chamber to the side thereof opposite said arm and then up to the header, the portions of the outer tubes extending past the primary chamber side being spaced outwardly from the similar portions of the inner tubes.

6. A heating plant as claimed in claim 1 in which some of the tubes of each distributor arm are inner and outer tubes extending beneath the primary chamber to the side thereof opposite said arm and then up to the header, the portions of the outer tubes extending past each primary chamber side being spaced outwardly from the similar portions of the inner tubes, and the remainder of the tubes of said arm extend directly up to the header along the side of said primary chamber above the arm, the portions of the latter tubes extending past the primary chamber side being in line with and spaced outwardly from the inner tubes.

7. A heating plant as claimed in claim 1 including a horizontal upper header positioned near the level of the back end of the primary chamber, a horizontal lower header positioned immediately below the bottom of the primary chamber at the front end thereof, central pipes connecting the upper and lower headers respectively to the large common header and the distributor connector, and said other water tubes extending along the bottom of the primary chamber extend between the horizontal lower and upper headers.

8. In a heating plant, an open-topped combustion chamber having a solid bottom and a defining wall projecting upwardly therefrom, a distributor below and spaced from the chamber, said distributor having two arms extending beneath and in the same direction as opposite sides of the chamber and a connector extending between ends of said arms beneath an end of the chamber, a large common header extending immediately above the open top of the chamber centrally thereof and substantially parallel with the distributor arms, and a plurality of spaced water tubes extending upwardly from the distributor past the combustion chamber to the common header, some of said water tubes extending upwardly from the distributor arms past the sides of the combustion chamber and inwardly over the open top of the latter, other of said water tubes extending from each distributor arm beneath the combustion chamber to the side thereof opposite their arm and then up and over said chamber, and the remainder of said water tubes extending from the distributor connector beneath the bottom of the combustion chamber to the end thereof opposite the end under which said connector is located and then up towards the common header.

9. A heating plant as claimed in claim 8 including a back header positioned above the level of the top of the back end of the combustion chamber at the end thereof remote from the end under which the distributor connector is located, said back header being connected to discharge into the large common header by at least one pipe, and in which the tubes from the distributor connector extending beneath the combustion chamber open into the back header.

References Cited in the file of this patent

UNITED STATES PATENTS

| | | |
|---|---|---|
| 673,494 | Burke | May 7, 1901 |
| 821,558 | Wegener | May 22, 1906 |
| 1,938,705 | Magis | Dec. 12, 1933 |
| 2,614,542 | Donahue | Oct. 21, 1952 |